Figure 1:
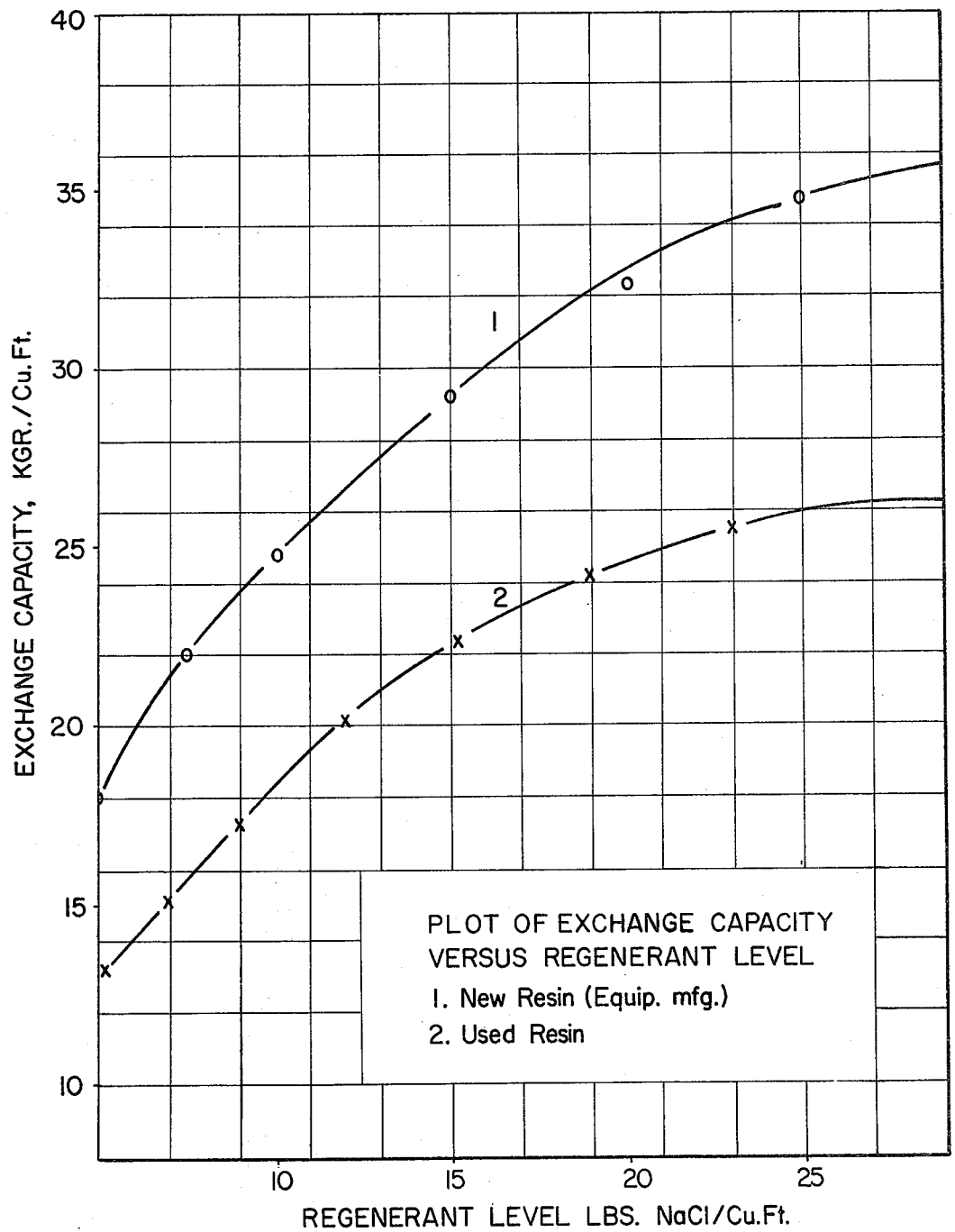

| United States Patent [19] | [11] 3,977,968 |
|---|---|
| Odland | [45] Aug. 31, 1976 |

[54] ION EXCHANGE REGENERATION

[75] Inventor: Karsten Odland, La Grange Park, Ill.

[73] Assignee: Nalco Chemical Company, Oak Brook, Ill.

[22] Filed: June 19, 1975

[21] Appl. No.: 588,437

Related U.S. Application Data

[63] Continuation-in-part of Ser. No. 350,879, April 13, 1973, abandoned.

[52] U.S. Cl. .................................. 210/32; 210/38 A
[51] Int. Cl.² ........................................ B01D 15/06
[58] Field of Search .............. 210/28, 38 A, 34, 30, 210/32, 139, 140, 190

[56] References Cited
UNITED STATES PATENTS

| 3,312,617 | 4/1967 | Klein | 210/35 |
| 3,493,498 | 2/1970 | Abrams et al. | 210/32 |
| 3,528,912 | 9/1970 | Popper et al. | 210/28 |
| 3,639,231 | 2/1972 | Bresler | 210/23 |

Primary Examiner—Charles N. Hart
Assistant Examiner—Ethel R. Cross
Attorney, Agent, or Firm—John G. Premo; John S. Roberts

[57] ABSTRACT

An improvement in closed cycle regeneration of sodium zeolite water softeners using sodium chloride soft brine input which comprises correlating the volume of liquid through the zeolite softener column so that in the effluent the alkaline earth metal content calculated as calcium carbonate has a maximum value of about 16,000 ppm. The sodium chloride soft brine input is selected as 8-12% with optimum 10%.

8 Claims, 2 Drawing Figures

ION EXCHANGE REGENERATION

This is a continuation-in-part application of prior pending application Ser. No. 350,879 filed Apr. 13, 1973, now abandoned.

The present invention lies in the area of reconstituting exhausted zeolite softeners which are used in water softening. So-called zeolite softening is well known as, for example, in the chapter of the same name in the Betz Handbook of Industrial Water Conditioning, 6th Edition, 1962. The constitution of such columns is sometimes denoted by the symbol $Na_2Z$ for sodium zeolite and the water softening is an exchange of cations between sodium and the alkaline earth metals; namely, calcium, magnesium, etc. The removal of the calcium and magnesium values from the downstream side of the sodium zeolite softener removes the so-called hardness from the water and allows applicability of the downstream water to such sensitive embodiments as boilers. From time to time as the sodium zeolite columns become exhausted due to accumulation of hardness on the zeolite beds, it is necessary to rehabilitate or regenerate the sodium zeolite softener; i.e., to restore the zeolite to the sodium form.

As above stated, ion exchange in water softening involves the exchange of sodium ions in the resin for alkaline earth ions; i.e., calcium and magnesium ions. This exchange is referred to as the exhaustion reaction and the regeneration step to which this invention applies is simply the reverse of the exhaustion step with the restoration of the zeolite to the sodium form; see Encyclopedia of Chemical Technology II, 22:101, 1970. Although originally inorganic zeolites were utilized, now organic resins are used exclusively for ion exchange purposes in water softeners. For exchange of cations as in the present situation, a strong acid ion exchange resin is utilized, best exemplified by sulfonated styrene-divinylbenzene copolymer products wherein the variation in the particular product lies in the degree and closeness of cross-linking. Such products currently are manufactured under tradenames such as Dowex HCR-W and other products such as Amberlite IR-120, Amberlite IR-200, Dowex 50, Dowex 50W, Dowex MPC-1, Duolite C-20, and Duolite C-25. These polymers are noted in the Encyclopedia of Chemical Technology II, 11:874, 1966.

Additionally, preferred resins include the more recent macroreticular resins which show greater cross-linking and greater stability as exemplified by Duolite C-25, Amberlite 200, Dowex MPC-1, and Duolite ES-26.

The preference for the sulfonated styrene-divinylbenzene resins originated in 1944 with the appearance of U.S. Pat. No. 2,366,007 D'Alelio to the General Electric Company. The present popularity, amounting to almost universal use of the sulfonated styrene-divinylbenzene resins in water softeners, is due to the superior capacity carrying over to the present time and which in 1944 showed that the divinylbenzene resins had twice the capacity of comparable phenolic cation exchange resins and about three times that of inorganic zeolites.

Additional operable strong acid cation exchange resins for the present invention are set out in the Encyclopedia of Polymer Science and Technology, 7:696, 1967, Table 3, which is incorporated by reference with this application.

It is possible to operate the present invention using a sulfonated phenol aldehyde product as exemplified by such products as Duolite C-3, Kationite KU-1, Lewatit KSN, and Wofatit F, but these resins are not preferred.

In the past the so-called spent zeolite brines hardened with calcium and magnesium values have been released as ordinary sewage or placed in ponds where their presence has formed an ecological problem and, further, in some jurisdictions subject to civil and criminal sanctions. The problem is increasingly acute where the spent zeolite brines are in areas where water is scarce and the ordinary salinite of water supplies is high. To avoid this, manufacturers have generally utilized processes which comprise converting hard or spent brine from zeolite to chemical forms which are disposable and/or commercially usable.

The concentration of the input sodium chloride brine is selected as 8–12% for the operation and a 10% value is optimum for the operaion of the apparatus with spent brine. The concentration of sodium chloride brine in the closed cycle apparatus varies within some limits, being higher at the beginning and less concentrated at the end of the cycle.

The present treatment for spent brine of high hardness utilizes a closed cycle wherein the calcium and magnesium values are removed by treatment with soda ash to precipitate calcium carbonate and sequentially also sodium hydroxide to precipitate magnesium hydroxide. Subsequently, the water layer or solution is removed, acidified with HCl to a pH of below 8.0, and later returned during the regeneration process as input soft brine to the zeolite column.

It has further been found that where the zeolite effluent brine contained a total hardness concentration, prior to alkali metal ion treatment, in excess of 16,000 ppm calculated as calcium carbonate, a slurry resulted which had the appearance of a jelly and which was very slow in dewatering and resulted in excessive sludge volumes even after prolonged settling. The present invention lies in adjusting the volume in the closed circuit process so that the total hardness measured as calcium carbonate in the effluent from the sodium zeolite column is 16,000 ppm or less. The present invention may be also viewed as a method of reconditioning spent brine to generally reduce the hardness values so as to avoid high concentrations of total hardness in the used brine and in this way avoiding a settling and dewatering problem.

PRIOR ART

The patented prior art believed pertinent to the present application is as follows:

U.S. Pat. No. 3,312,617 Klein (Combustion Engineering) 210/35 At column 4 the patentee is concerned with regeneration but the spent regenerating solution is disposed of and not utilized in a closed circuit. Further, the patent utilizes excess sodium chloride only for purposes to show that it is economically unfeasible as set out in FIGS. 2 and 3 and at column 2, lines 11–23, and the patentee is not concerned with keeping the total hardness value at a maximum of 16,000 ppm calculated as calcium carbonate to avoid a jelly precipitate.

U.S. Pat. No. 3,493,498 Abrams et al. (Diamond Shamrock) 210/32 In this patent use is made of an acid, either hydrochloric or sulfuric, for elution or regeneration of the resin and at column 4, lines 42–45, the patentee utilizes only 110–120% of stoichiometric amount of acid required to remove the hardness.

U.S. Pat. No. 3,528,912 Popper et al. (USA—Agriculture) 210/34 At column 3 the patentee appreciates the difficulty with the gelatinous material attributed to magnesium hydroxide. Rather than attention to the total hardness, the patent utilizes (1) a special filter, (2) the obtaining of a fresh precipitate, and (3) an upward moving regeneration liquid to accomplish control over the bothersome gelatinous precipitate.

U.S. Pat. No. 3,639,231 Bresler (Bresler and Associates) 210/32 This patent is specifically oriented to the desalination of brackish water by reverse osmosis. The brine may be used to regenerate a used ion exchange resin and, referring to FIG. 1 of the patent, the word description at column 3, lines 40–53, and, referring to FIG. 2 of the patent, the word description at column 4, lines 7–18, are pertinent. With regard to this patent it is believed that the utilization of very low input concentration of sodium chloride in the area of 1% in itself allows the self-control of alkaline earth values to a low level and is not concerned with the problems of the present invention. This is apparent from the consideration of the total ion values shown in Tables 1–2, which are considered in Examples 1–2, and especially the input at line 10. In this Bresler patent it is noted that the initial concentration of brine is in the neighborhood of 1% (10,000 ppm) and that the Bresler system would not be applicable to maintain an alkaline earth carbonate at 16,000 or below, but if the input were increased to 10%, it is calculated that the patentee's total hardness concentration of the spent brine would be in the neighborhood of 40,000 ppm. Also, the Bresler patent makes no mention of recovering a calcium precipitate.

EXAMPLES

SPENT BRINE HARDNESS CONCENTRATION

In the operation of the present invention, it has been found that the total hardness concentration consisting of the combination of magnesium and calcium values measured at the effluent from the regeneration column must be a value of not greater than 16,000 ppm measured as calcium carbonate in order to obviate the difficulties encountered during later treatment of these values by an alkali metal treating agent as here a combination of sodium carbonate (soda ash) followed by sodium hydroxide.

It has been further found that high concentrations of hardness in the effluent brine can be obviated by increasing the regenerant level of sodium chloride measured in pounds per cubic foot of the column. Table 1 illustrates the utilization of increasing amounts of brine regenerant by volume in gallons which increases the total amount of sodium chloride and increases the regenerant level of sodium chloride in pounds per cubic foot. Based upon a 70 cubic foot reactor and utilizing Dowex HCR-W, a sulfonated styrene-divinylbenzene resin, the calculated total hardness value will drop below 16,000 ppm at about a brine volume (10% NaCl) of 2,000; whereas, for new resin with considerably increased capacity, a brine volume of between 2,500 and 3,000 is necessary to reduce the total hardness below 16,000 ppm. Where the regeneration process was operated to give total hardness values of no greater than 16,000, the precipitate later obtained was manageable in character and suitable for some; whereas, when this value was exceeded, the precipitate was gelatinous in nature and produced serious process consequences. It is believed the gelatinous nature of the precipitate is due to the presence of magnesium hydroxide which may form magnesium carbonate in one or more hydrated species of waters of hydration.

TABLE 1

Calculated Regenerant Levels and Spent Brine Hardness Concentrations

| Brine Vol. Gals. | NaCl lbs. | Regen. Level NaCl lbs/cu.ft. | New Resin Capacity Kgr/cu.ft. | Used Resin Cap. (Estim.) Kgr/cu.ft. | Calc. Tot. Hard. of Spent Brine ppm CaCO$_3$ New Resin | Used Resin |
|---|---|---|---|---|---|---|
| 500 | 447 | 6.4 | 20 | 13.5 | 48,000 | 32,000 |
| 1000 | 894 | 12.6 | 27.3 | 20.5 | 32,700 | 24,000 |
| 1500 | 1340 | 19.2 | 32.0 | 24.3 | 25,600 | 19,400 |
| 2000 | 1790 | 25.2 | 35 | 26.2 | 21,000 | 15,600 |
| 2500 | 2235 | 31.9 | 36.8 | 27 | 17,500 | 12,900 |
| 3000 | 2685 | 38.4 | 38 | 27.7 | 15,000 | 11,000 |

Based on 100% exhaustion and 100% brine recovery.
Concentration of brine is 10%.

DESIGN AND CALCULATIONS

In the conventional design and operation of sodium zeolite exchangers, extensive efforts have been made to attain maximum salt efficiencies or minimum amount of salt used per kilograin of operating capacity achieved. Salt efficiency is defined as pounds of salt used per kilograin capacity. The value 0.3 lbs NaCl/kgr is frequently utilized. Also, a regenerant level of 6 lbs NaCl/cu.ft. of zeolite is also frequently utilized.

At this level of regeneration, assuming an efficiency of .3, the operating capacity would amount to $$C_6 = \frac{6 \text{ lbs/cu.ft.}}{.3 \text{ lbs/kgr}} = 20 \; \frac{\text{kgr}}{\text{cu.ft.}} \text{ as CaIO}_3$$

Assuming that the regenerant is applied at 10%, which is a normal value and as this application teaches, the regenerant volume would be $$V_6 = \frac{6 \text{ lbs/cu.ft.}}{.85 \text{ lbs/gal.}}$$

since 10% is equivalent to approximately 0.85 lbs/gal. Therefore, $$V_6 = 6/0.85 = 7 \text{ gals/cu.ft.}$$

During regeneration, 20 kgr of hardness is removed from the zeolite and dissolved in 7 gals. of volume (brine). The hardness concentration in the spent brine is therefore $TH_6 = 20{,}000$ grains/7 gals.

$TH_6 = 2860$ grains/gal. (gpg)

Since 1 gpg = 17.1 ppm, $TH_6 = 49{,}000$ ppm

The present invention relates to a method of controlling the total hardness in the spent brine.

FIG. 1 is a plot of column exchange capacity versus regenerant level wherein the exchange capacity is measured in kilograins per cubic foot and the regenerant level is measured in pounds of sodium chloride per cubic foot. The exchange column is this case was a 70-foot column of Dowex HCR-W, a sulfonated styrene-divinylbenzene reticulated resin. In plotting exchange capacity versus regenerant level, it has been found that increasing the regenerant level also increases the exchange capacity for the next cycle but that the curve flattens out on increasing the regenerant level. This fact assists and makes possible the control of the total hardness concentration in the hard brine by controlling cycle volume and excess brine volume applied during each regeneration. In conventional commercial uses the regenerant level of sodium chloride is 6–8 lbs/ft$^3$; whereas, in the present invention, the regenerative level may be as high as 25.2–38.4 lbs/ft$^3$.

In essence, the present invention is the control of excess of hardness values by the application of an excess volume of regenerating brine of a calculated concentration through the column. The volume of this brine and the concentration thereof also determine the capacity of the column during the subsequent cycle. Total hardness in the spent zeolite brine is a function of total quantity of hardness removed from the column during regeneration with brine and the total volume of the applied brine. As seen in FIG. 1, as higher regenerant levels of sodium chloride are applied, higher exchange capacities are realized. However, such correlations are not linear, and when brine is applied in excessive quantities, corresponding exchange capacities taper off to values close to 40 kilograins per cubic foot of resin. This will yield a total hardness concentration in the spent brine of decreasing values as increasing brine volumes are applied.

It is also possible to control the total hardness in the spent brine by controlling the loading of alkali metals of calcium and magnesium on to the zeolite bed during the exhaustion part of its cycle. This can be accomplished simply by terminating the exhaustion run prior to the complete exhaustion of the zeolite bed as evidenced by its allowing the divalent cations to pass through to the effluent stream. Premature termination of the exhaustion runs results in lower operating capacity of the exchange bed and also lower concentration of hardness in the spent brine. However, premature termination of the exhaustion run applies to the same principles of controlling total hardness in the spent brine; namely, one by use of excessive quantities of regenerant, over and above that amount required to provide that portion of the operating capacity which is actually utilized.

Because of the need to apply excessive quantities of brine in order to control hardness of the spent brine, it is necessary to apply higher regenerant flow rates than normally used in industrial zeolite installations. The main reason for this is the excessive quantities of brine utilized and the need to complete the regeneration cycle within a specified time limit. Flow rates need not be controlled very accurately since more than adequate quantities of brine are applied, resulting in adequate contact time.

Jar tests made on composite brine samples collected during regeneration of a unit similar to that utilized in FIG. 1 show that satisfactory precipitates were obtained where the total hardness was 16,000 ppm of calcium carbonate and additional experiments showed that satisfactory settling rate and texture of precipitate were obtained where such total hardness was 15,900 ppm, 12,000 ppm, and 4,000 ppm. Difficulties were encountered in the range greater than 16,000 as, for example, at a total hardness of 25,000 ppm where sludge was obtained ranging from 30–50% which was unacceptable to the commercial process.

Figure 2:
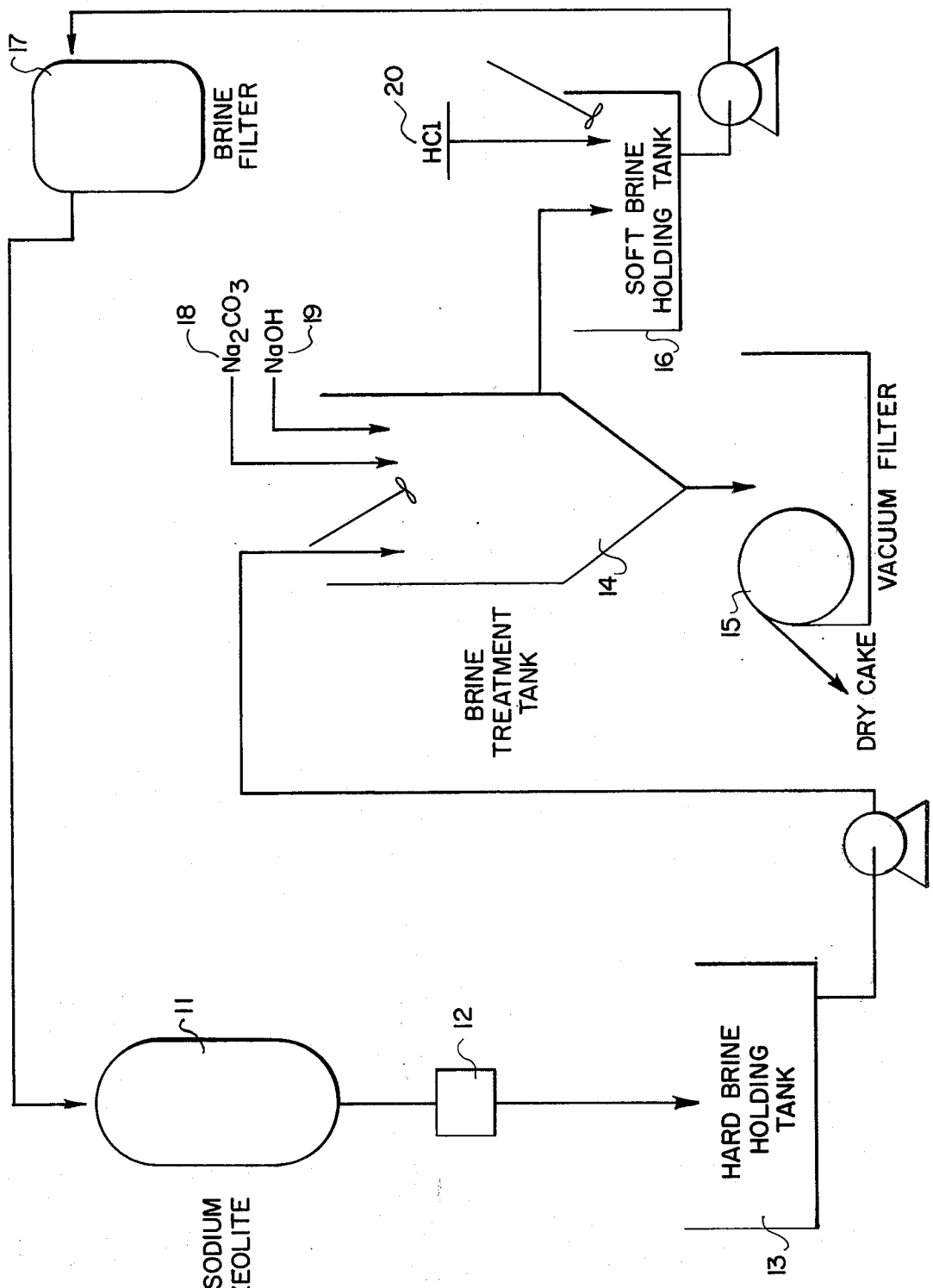

FIG. 2 represents a diagrammatic illustration of the regeneraion process which is described as follows:
11 is an exhausted column of sodium zeolite;
12 is a measuring station for measuring total hardness;
13 is a hard brine holding tank wherein the alkaline earth metal values are eluted;
14 is a brine treatment tank wherein incrementally sodium carbonate and sodium hydroxide are added to precipitate calcium carbonate and magnesium hydroxide;
15 is a vacuum filter for removing hardness values;
16 is a soft brine holding tank;
17 is a soft brine filter;
18 is sodium carbonate addition;
19 is sodium hydroxide addition;
20 is hydrochloric acid addition.

According to the diagram, the exhausted sodium zeolite column or a partly exhausted column, is regenerated with soft brine usually at 10% NaCl (and varying from 8–12% NaCl). The amount of brine volume passing through the zeolite is calculated so that an excess of brine volume is utilized in order to control the total hardness content of the effluent to a value not greater than 16,000 ppm calculated as calcium carbonate. The hard brine effluent passes through a measuring station 12 and a holding tank 13 to a treatment tank 14 wherein sequentially sodium carbonate 18 and sodium hydroxide 19 are added to precipitate the calcium and magnesium. Subsequently, the brine moves to the soft brine holding tank 16 where the pH is reduced to below 8.0 by means of HCl 20. Hydrochloric acid is used here since its anion fits the schemat of regeneration by sodium chloride. The brine is then filtered 17 for a closed cycle return to use to remove further hardness from the sodium zeolite column. The utilization of a circular or closed circuit process overcomes the prior objection to so-called dilution or use of excess brine in regeneration, since the sodium values are retained in the circuit and only the hardness values are lost via the precipitate route at 15.

I claim:

1. A process for the regeneration of a column of an exhausted sodium zeolite softener which comprises feeding an excess of substantially pure soft sodium chloride brine at a concentration of about 8–12% as input regenerating liquid to said zeolite column and removing from said zeolite column a hard brine containing substantial amounts of alkaline earth metal values, adjusting the total volume of regenerative liquid passing through said zeolite column so that the alkaline earth metal values calculated as $CaCO_3$ have a maximum value of about 16,000 ppm so as to avoid the formation of a gelatinous product and further precipitating the alkaline earth metals by utilization of sodium carbonate and sodium hydroxide, removing the calcium and magnesium precipitates formed and adjusting the pH of the so-treated liquid to below 8.0 with HCl to produce a softened brine suitable for recycle as the regenerating liquid.

2. The process according to claim 1 wherein the input sodium chloride brine is about 10% concentration.

3. The process according to claim 1 wherein the sodium zeolite softener is a sulfonated styrene-divinylbenzene resin.

4. The process according to claim 1 wherein the sodium zeolite softener is a sulfonated phenol aldehyde resin.

5. A process for the regeneration of a column of a partly exhausted sodium zeolite softener which comprises feeding an excess of substantially pure soft sodium chloride brine at a concentration of about 8–12% as input regenerating liquid to said zeolite column and removing from said zeolite column a hard brine containing substantial amounts of alkaline earth metals and adjusting the volume of exhausting liquid previously applied, and the volume of regenerating brine going through the column so that the concentrations of alkaline earth metals in the spent brine effluent, calculated as $CaCO_3$, have a maximum value of about 16,000 ppm so as to avoid the formation of a gelatinous product, and further precipitating the alkaline earth metals by utilizing sodium carbonate and sodium hydroxide, removing the calcium and magnesium precipitates formed, and adjusting the pH of the so-treated liquid to values below 8.0 with HCl to produce a softened brine suitable for recycle as the regenerating liquid.

6. The process according to claim 5 wherein the input sodium chloride brine is about 10% concentration.

7. The process according to claim 5 wherein the sodium zeolite softener is a sulfonated styrene-divinylbenzene resin.

8. The process according to claim 5 wherein the sodium zeolite softener is a sulfonated phenol aldehyde resin.

* * * * *